March 17, 1953     E. J. BOYSEL     2,631,651
REVOLVING SEAT JUVENILE VEHICLE

Filed March 12, 1949     3 Sheets-Sheet 1

INVENTOR.
EDWARD J. BOYSEL
BY Alfred R. Fuchs
ATTORNEY

March 17, 1953 E. J. BOYSEL 2,631,651
REVOLVING SEAT JUVENILE VEHICLE
Filed March 12, 1949 3 Sheets-Sheet 2

INVENTOR.
EDWARD J. BOYSEL
BY
Alfred R. Fuchs
ATTORNEY

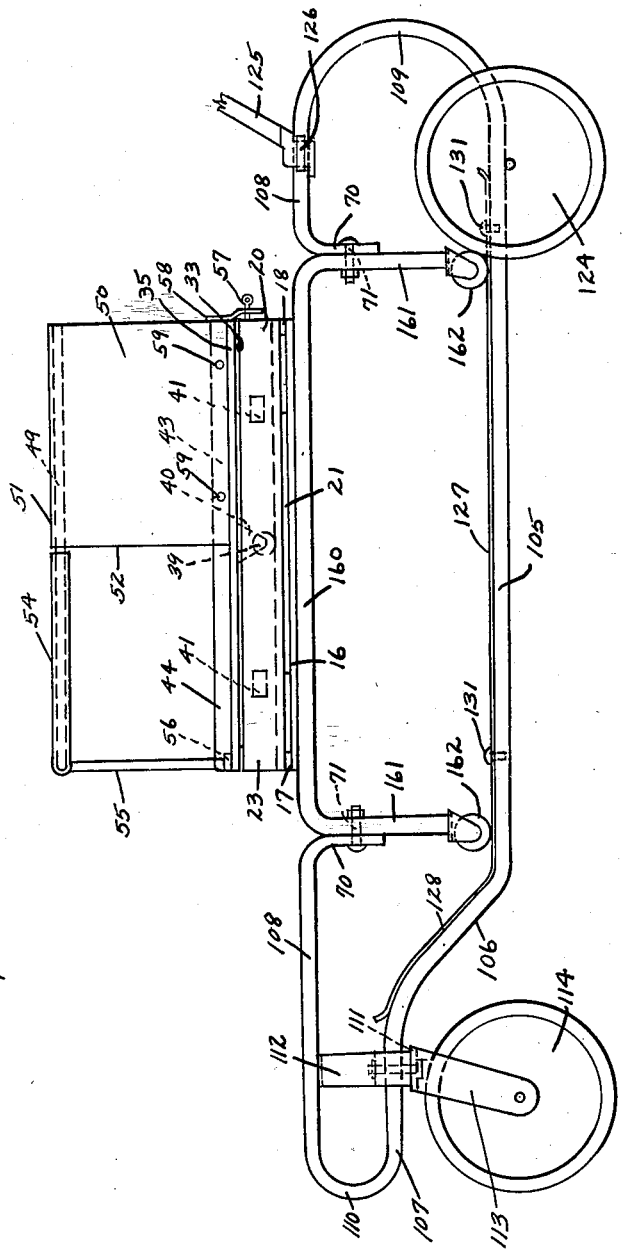

Patented Mar. 17, 1953

2,631,651

UNITED STATES PATENT OFFICE 2,631,651

REVOLVING SEAT JUVENILE VEHICLE

Edward J. Boysel, Sedalia, Mo.

Application March 12, 1949, Serial No. 81,115

3 Claims. (Cl. 155—22)

My invention relates to juvenile vehicles, and more particularly to a juvenile vehicle provided with means for confining a small child therein, including a seat that is rotatable on said vehicle.

In vehicles for small children, such as strollers and baby walkers, the child occupying the vehicle frequently gets out of position therein and in a twisted or uncomfortable position because of the fact that the child tries to turn around from the position in which it is facing in its normal position in the vehicle. This is particularly encountered in connection with strollers where the person pushing the vehicle is back of the seat with the child facing forwardly, with the result that the child tries to turn around to look at the person pushing the vehicle, which is substantially impossible in the ordinary stroller or similar vehicle, without the child getting out of its position in the seat and twisting around to look backwardly from the seat. In vehicles that are mounted on casters, such as baby walkers, the child also does not have full freedom of action because of the fact that while the vehicle can move in any direction, the child confining part thereof is ordinarily so constructed and arranged that there is only one position on the vehicle in which the child can sit or stand without twisting out of the intended position therein.

It is the principal purpose of my invention to provide vehicles of the above mentioned character with confining means for the child that embodies a seat that is rotatably mounted on the vehicle so that the child can turn the seat on its mounting in such a way as to face in any desired position relative to the vehicle. My invention is applicable both to strollers and baby walkers. Strollers are ordinarily provided with one set of swivel wheels at one end thereof so as to permit readily turning of the vehicle in different directions, while baby walkers are ordinarily provided with all the wheels thereof swiveled, being ordinarily provided with casters, so that the walker can move in any direction in which it is impelled by the child. Rotation of the rotatable mounting for the seat is obtained in the case of a stroller by engagement of the feet of the child with the floor that is ordinarily provided in such a stroller, which is located below the seat, while in a walker the seat is so arranged that the child, while either sitting in the seat or while in a standing position within the confining means of which the seat is a part, can engage the floor with its feet to walk and thus move the walker about on a floor or similar member and turn to any desired position by means of the rotatable mounting for the confining means and seat.

In my improved juvenile vehicle the rotatable mounting is, preferably, of such a character that it constitutes part of the confining means for the legs of the child, the seat and a ring-like member constituting the rotatable mounting for the seat forming such confining means. Preferably, the rotatable mounting comprises a stationary ring-like member mounted on the base of the vehicle and a cooperating ring-like member having a flange overlapping the stationary ring-like member and provided with means for rotatably mounting the same on the stationary ring-like member. A flange is provided so as to enclose the operating parts to prevent any engagement of the child's body members with any of the rotatable mounting means or other parts that might pinch or otherwise injure the child.

One of the important purposes of my invention is to provide means for amusing a small child by providing a rotatable mounting for a seat in a juvenile vehicle, such rotatable mounting providing means for amusing a small child for long periods of time while confined in the vehicle in such a manner that no harm can come to the child and it can not go to any point where it can come in contact with anything harmful or out of the observation of the one who is watching over the child.

Other objects and advantages of my invention will appear as the description of the drawings proceeds. I desire to have it understood, however, that I do not intend to limit myself to the particular details shown or described, except as defined in the claims.

In the drawings:

Fig. 5 is a view in side elevation, partly broken away, of a further modification.

Figure 1:
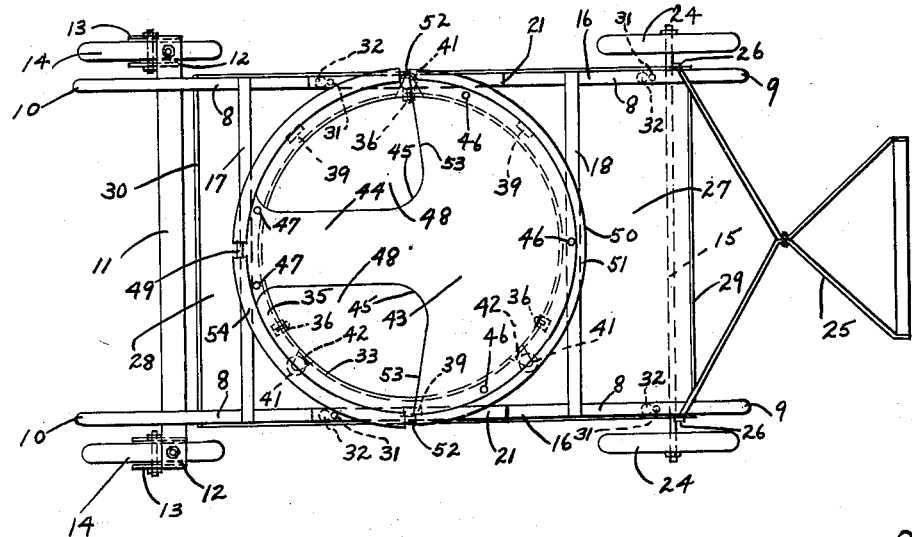
Fig. 1 is a top plan view of a stroller to which my invention is applied.
Figure 2:
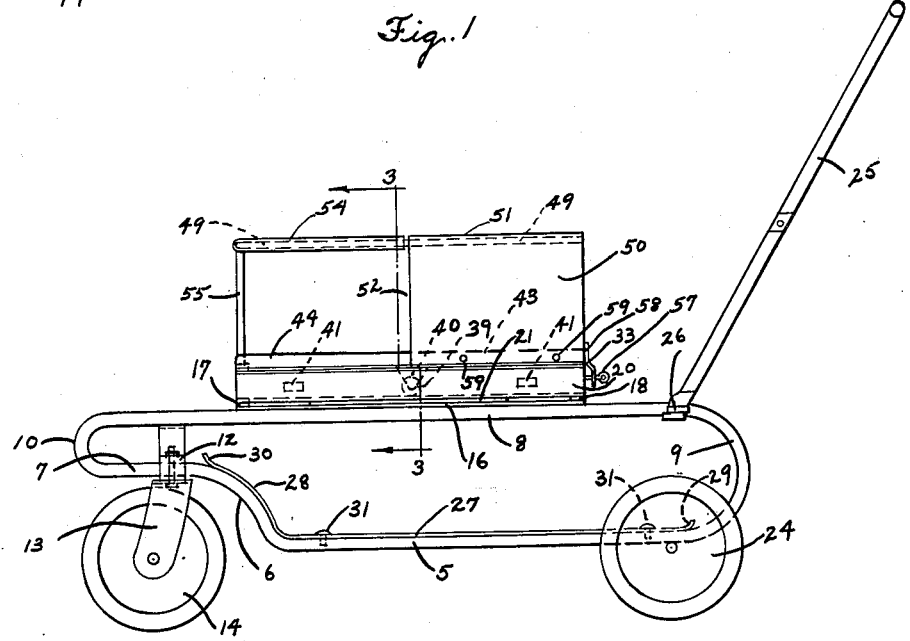
Fig. 2 is a side elevation thereof.

Referring in detail to the drawings, in Figs. 1 and 2 is shown a stroller that is provided with a base portion including side frames that may be made of tubular members, each of said side frames having a lower longitudinally extending portion 5 that has an upward offset 6 providing a raised portion 7 at one end thereof and an upper longitudinally extending portion 8 connected with the portions 5 and 7 by means of curved portions 9 and 10. A transversely extending frame member 11 connects the raised portions 7 of the side frames at the forward ends thereof and has brackets 12 thereon mounted on the outer ends thereof beyond the side frames upon which the wheel carrying brackets 13 are swiveled, the wheels 14 being suitably mounted on said brackets 13. The brackets 12 have obliquely extending bracing portions, shown in Fig. 3, connected with the upper portions 8 of said side frames by welding or in a similar manner.

The stationary axle 15 connects the bottom portions 5 of the side frame members near their rear ends, and a supplemental frame is mounted on the side frames, being connected in fixed position therewith, as by welding to the top members 8 thereof. Said supplemental frame comprises longitudinally extending members 16 and transversely extending members 17 and 18. A flanged ring-like member 20 is fixed by welding or in a similar manner to the supplemental frame, being, preferably, welded to the longitudinally extending members 16 and the transversely extending members 17 and 18. If desired, a pair of filler members 21 may be provided between the longitudinally extending members 16 and the ring-like member 20, welded to both the longitudinally extending members 16 and the ring-like member 20. Said ring-like member is made angular in cross section and has the bottom flange 22 thereof fixed on the supplemental frame and has an upstanding annular flange 23.

Wheels 24 are provided on the axle 15 and a detachable handle member 25 is provided for pushing the stroller, the same being detachably mounted in suitable brackets 26 provided on the side frames. A sheet metal floor member 27 is provided, which is mounted on said side frames and extends between the bottom portions 5 and upwardly along the curved offset portion 6, having an upwardly curved portion 28 extending along said offset portion 6. Said floor member may be provided with upwardly turned end edges 29 and 30 and is mounted in position by means of headed fastening elements 31 that engage in keyhole slots 32 in the floor member 27 for detachably mounting said floor member on the vehicle.

Figure 3:
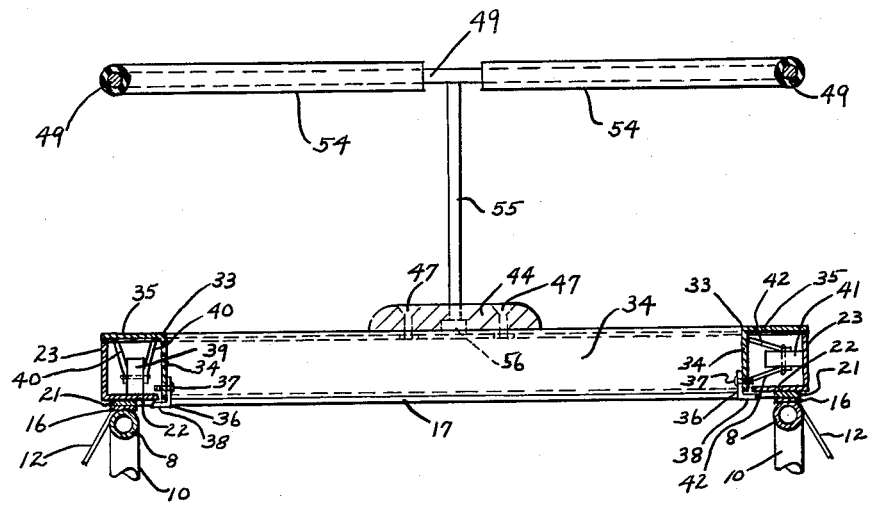
Fig. 3 is a section taken on the line 3—3 of Fig. 2 on a somewhat enlarged scale.

Cooperating with the stationary circular track member 20 is a circular turntable member 33, which is provided with a depending annular flange 34 and a horizontal flange 35, the horizontal flange 35 overlapping the upwardly extending leg 23 of the member 20 and the depending or vertical flange portion 34 overlapping the bottom flange 22 of the member 20, as shown in Fig. 3, and being slightly spaced from the inner edge thereof. The flange 35 is also slightly spaced from the top edge of the annular upstanding flange 23 of the member 20 when the parts are in operative position. The flange 34 is provided with a plurality of angular retainer members 36 secured thereto, these being in the form of clips that are fastened by headed fastening elements 37 to the depending flange 34, and have horizontal flange portions 38 thereon that underlie the flange 22 so as to limit upward movement of the ring-like member 33 relative to the ring-like member 20.

The ring-like member 33 is mounted rotatably in the ring-like member 20 by suitable anti-friction means, such as the wheels or rollers 39 mounted by means of brackets 40 on the horizontal flange 35 of the ring-like member 33, and the rollers or wheel-like members 41 mounted on brackets 42 extending from the depending flange 34 of the member 33, the rollers 41 engaging the flange 23 and the rollers 39 engaging the flange 22 so as to maintain the ring-like member 33 concentric to the ring-like member 20. A plurality of the rollers 39 rotating about horizontal axes and a plurality of the rollers 41 rotating about vertical axes is provided, preferably, at least three of each being provided so as to maintain the co-axial relationship between the ring-like members 20 and 33 and the relative vertical spacing thereof shown in Fig. 3.

Mounted on the ring-like member 33 is a seat 43, which has a reduced forward extension 44 connected with the main body portion of the seat by curved edge portions 45. The seat is secured to the flange 35 of the member 33 by means of suitable headed fastening elements 46 extending through the main body portion of the seat and headed fastening elements 47 extending through the forward end of the reduced extension 44 of the seat. It will be obvious that with the seat mounted in position as shown in Fig. 1, there will be a leg opening 48 provided on each side of the reduced extension 44 between said ring-like member and the seat.

Suitable guard means or confining means is provided on the rotatable ring-like member comprising a ring-like bar member 49, which has the upper end of a sheet metal back 50 secured thereto, which sheet metal back is curled over at 51 to fit around said rod-like member and is curved so as to be substantially semi-circular, the forward edges 52 thereof terminating substantially in alignment with the outer ends of the forward inclined edges 53 of the seat. Said rod-like member 49 also has, preferably, rubber tubes 54 provided thereon serving as cushioning means or hand grip members, and also has a depending rod-like member 55 fixed thereto, as by welding, and connecting the same with the forward end portion of the reduced seat portion 44, being secured thereto by any suitable means, such as the nut 56 mounted in a recess in the member 44 engaging the threaded lower end of the member 55. Thus the member 55 serves as a standard for supporting the confining means at the forward end thereof.

It will be obvious that the occupant of the vehicle can put its feet on the floor 27 and rotate the seat confining means and all other parts mounted on the rotatable ring-like member 33 to any desired position so that the occupant of the vehicle will be facing forwardly, rearwardly, or sidewise relative to the vehicle, or in any angular position between these various positions. It will also be obvious that the seat and confining means associated with the seat can be rotated very easily due to the roller mounting thereof. If it is desired to prevent rotation of the rotatable seat and accompanying parts, suitable holding means for this purpose can be provided, such as a pin 57 extending through an opening in a bracket 58 secured to the member 50 and through an aligning opening in the upstanding flange of the member 20. The member 58 is secured to the seat 43 by suitable headed fastening elements 59, such as wood screws.

Instead of providing the rotatably mounted seat and confining means on a stroller or similar vehicle, the same can be provided on a baby walker or other similar device that is mounted on casters. The ring-like member 20 is mounted on a supplemental frame, such as that previously described, provided on a base member that has a pair of side members that have upper longitudinally extending portions 60 and depending legs 61, on the lower ends of which the casters 62 are swiveled. As the supplemental frame is mounted on the members 60 in the same manner as the supplemental frame previously described is mounted on the member 8 and is made in the same manner as previously described, the same reference numerals are applied thereto in Fig. 4 as in Figs. 1 to 3, and as the seat and confining means are constructed in the same manner and are mounted similarly in the form of the invention shown in Fig. 4 as that shown in Figs. 1 to 3, inclusive, the same reference numerals are applied thereto in Fig. 4 as in Figs. 1 to 3, inclusive. Furthermore, as the mounting of the ring-like member 33 on the ring-like member 20, and the ring-like member 20 on the supplemental frame is the same in Fig. 4 as in the form of the invention shown in Figs. 1 to 3, inclusive, the same reference numerals are applied thereto as in Figs. 1 to 3, inclusive. The only difference between the structure shown in Fig. 4 and that shown in Figs. 1 to 3, inclusive, is that the side frame structure of the base or lower mounting means for the stationary ring-like member is of a different character and has the casters provided thereon instead of wheels.

Figure 4:
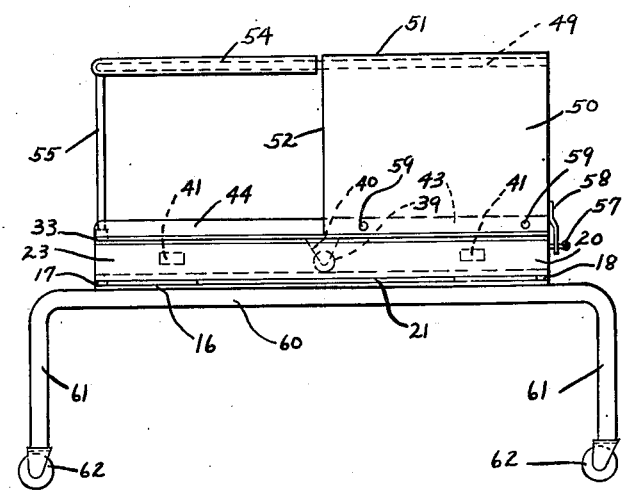
Fig. 4 is a view in elevation of a baby walker to which my invention is applied.

The operation of the apparatus shown in Fig. 4 is very similar to that shown in Figs. 1 to 3, inclusive, in that the child in the apparatus can engage the surface upon which the casters 62 engage, with its feet, to move the entire apparatus around over that surface and can also rotate the seat and confining means about so as to face in any desired direction while confined in the walker.

Not only can a child face in any desired direction in both the stroller and the walker illustrated in the drawings, but can amuse itself by rotating the seat and the confining means associated therewith back and forth as may be desired. Thus the apparatus provides not only a safe vehicle for the child, but also an amusement device for the child while in the same, whereby it can be entertained and has the freedom of turning in any direction desired, no matter how firmly the child might be secured on the seat, as by being strapped in or otherwise held in position thereon.

If desired, my invention can be applied to a combination stroller and walker, such as illustrated in Fig. 5, in which the side frames are provided as in the other forms of the invention, but instead of making the same in the form shown in Fig. 2, each side frame has a lower longitudinally extending portion 105, corresponding to the portion 5 shown in Fig. 2, an upwardly offset portion 106 providing the raised portion 107 corresponding to the portions 6 and 7 of the side frame shown in Fig. 2, and provided with curved portions 109 and 110 corresponding to the curved portions 9 and 10, previously described. The upper longitudinally extending frame members 108, however, are provided with downwardly extending end portions 70, which are flattened, and which are provided with openings therein for headed securing elements 71 that extend through aligning openings in the depending leg portions 161 of a side frame member having an upper transverse portion 160, corresponding to the side frame member 60 shown in Fig. 4, the depending legs 161 being provided with casters 162, corresponding to the casters 62 shown in Fig. 4.

There are, of course, a pair of side frames on opposite sides of the vehicle and a pair of frames 160 cooperating with said side frames. The side frames are connected by means of a transverse member 111, corresponding to the member 11 shown in Figs. 1 and 2, and with brackets 112, similar to the brackets 12, having the brackets 113 thereon, similar to the brackets 13 for mounting the swiveled wheels 114, corresponding to the wheels 14 shown in Figs. 1 and 2. The rear wheels 124 are mounted on a transverse axle in a similar manner to that previously described for the wheels 24 and a floor member 127 is mounted on the lower frame member 105 and has an upwardly extending portion 128, corresponding to the portion 28 of the floor member 27, and is held in place by means of headed fastening elements 131, engaging the frame member 105. A detachable handle 125 is provided, mounted in a similar manner to the handle 25 previously described, and engaging brackets 126 in a similar manner to that in which the handle 25 engages the brackets 26 shown in Figs. 1 and 2.

Mounted on the frame members 160 in a similar manner to that in which the supplemental frame previously described is mounted on the member 8, is a supplemental frame, which has the same reference numerals applied thereto as in Figs. 1 to 4, inclusive, as it is the same structure as those previously described. The lower ring-like member is made in the same manner as previously described and mounted in the same manner on the supplemental frame and has the same reference numerals applied thereto as in Figs. 2 and 4. The mounting of the upper ring-like member 33 on the lower ring-like member is also the same as previously described and the same reference numerals are applied thereto and to the mounting means therefor in Fig. 5 as in Figs. 1 to 4, inclusive. The seat 43 is mounted in the same manner as previously described and is the same in character as that previously described, having the reduced forward extension 44, and confining means that are the same as previously described are provided on said rotatable ring-like member 33, the same reference numerals being applied to said confining means as to the corresponding parts in the previously described forms of the invention.

The only difference between the structure shown in Fig. 4 and that shown in Fig. 5 is that the structure shown in Fig. 5 is provided with openings in the depending legs thereof for the securing elements 71, so as to make it possible to mount the walker shown in Fig. 4 on the floor 127 with the casters 162 in engagement with the floor. The stroller structure is modified from that shown in Figs. 1 to 3, inclusive, so as to provide for the mounting of the walker on the stroller frame, with the casters 162 on the walker in engagement with the floor 127. Thus, with the parts in the position shown in Fig. 5, the apparatus is a stroller with a revolving seat and confining means for a child mounted thereon. Furthermore, when it is desired to make a walker out of the apparatus with a revolving seat and confining means, all that is necessary is to remove the bolts 71 and place the entire upper structure, having the frames with the depending portions provided with casters thereon, on the floor or other supporting surface.

What I claim is:

1. A juvenile vehicle, comprising a base member, wheels on said base member, a seat superposed upon said base member having a main body portion and a reduced forward extension thereon, means for mounting said seat on said base member for rotation relative thereto, comprising a member rotating with said seat, and confining means mounted to rotate with said seat and connected with said main body portion of said seat and said forward extension, said confining means comprising a back extending upwardly from said seat, guard means extending from the upper portion of said back to said forward extension in upwardly spaced relation to said seat and reduced extension, and portions of the mounting member rotating with said seat extending from opposite sides of said main body portion of said seat to the forward portion of said reduced extension to confine the legs between the said portions of said mounting member rotating with said seat and said reduced extension.

2. A juvenile vehicle, comprising a base member, wheels on said base member, a ring mounted upon said base member, a ring mounted on said first mentioned ring for rotation relative thereto, a seat mounted upon said second ring to rotate therewith, said seat having a main body portion secured on top of said second ring and a reduced forward extension thereon extending to said second ring and secured thereto in spaced relation to said main body portion to provide leg openings between said main body portion, reduced extension and second ring, and confining means connected with said seat and forward extension and extending above said rings in vertically spaced relation thereto and mounted to rotate with said seat.

3. A juvenile vehicle, comprising a base member, wheels on said base member, a seat superposed upon said base member having a main body portion and a reduced forward extension thereon, means for mounting said seat on said base member for rotation relative thereto, comprising a member rotating with said seat, and confining means mounted to rotate with said seat and connected with said main body portion of said seat and said forward extension, said confining means comprising a back extending upwardly from said seat, guard means extending from the upper portion of said back to said forward extension in upwardly spaced relation to said seat and reduced extension, and portions of the mounting member rotating with said seat extending from opposite sides of said main body portion of said seat to the forward portion of said reduced extension to confine the legs between the said portions of said mounting member rotating with said seat and said reduced extension, said portions of said mounting member being positioned at the approximate level of said seat.

EDWARD J. BOYSEL.

REFERENCES CITED

The following references are of record in the file of this patent:

UNITED STATES PATENTS

| Number | Name | Date |
| --- | --- | --- |
| 152,992 | Helm | July 14, 1874 |
| 1,422,277 | Lindberg | July 11, 1922 |
| 1,688,922 | Drinosky | Oct. 23, 1928 |
| 2,198,813 | Hall | Apr. 30, 1940 |
| 2,425,253 | Little et al. | Aug. 5, 1947 |
| 2,426,432 | Breckner et al. | Aug. 26, 1947 |

FOREIGN PATENTS

| Number | Country | Date |
| --- | --- | --- |
| 25,235 of 1897 | Great Britain | Sept. 3, 1898 |